United States Patent
Wallis et al.

[15] 3,646,405
[45] Feb. 29, 1972

[54] HERMETIC SEAL

[72] Inventors: George Wallis, Lexington; John J. Dorsey, Waltham; Bernard L. Phillips, Norwood, all of Mass.

[73] Assignee: P. R. Mallory & Co. Inc., Indianapolis, Ind.

[22] Filed: Jan. 8, 1969

[21] Appl. No.: 789,799

[52] U.S. Cl............................317/230, 317/242, 174/50.61
[51] Int. Cl. ........................................................H01g 9/10
[58] Field of Search ......................317/230, 231, 233, 234; 174/52.5, 50.61

[56] References Cited

UNITED STATES PATENTS

| | | | |
|---|---|---|---|
| 2,210,699 | 8/1940 | Bahls | 174/50.61 X |
| 3,275,358 | 9/1966 | Shoneberger | 37/230 X |
| 3,275,359 | 9/1966 | Graff | 317/230 X |
| 3,275,901 | 9/1966 | Merritt et al. | 317/230 |
| 3,336,433 | 8/1967 | Johnson et al. | 174/52 |
| 3,489,845 | 1/1970 | Landron | 174/52 |
| 2,776,467 | 1/1957 | Brennan | 317/230 X |
| 2,876,401 | 3/1959 | Fuller | 317/235 |
| 2,923,866 | 2/1960 | Wagner | 317/230 |
| 3,268,778 | 8/1966 | Worsham | 317/234 |
| 3,305,624 | 2/1967 | Wagner | 174/52.5 |
| 3,398,340 | 8/1968 | Geoghegan | 317/260 |

*Primary Examiner*—James D. Kallam
*Attorney*—Richard H. Childress, Charles W. Hoffman, Robert E. Meyer and Henry W. Cummings

[57] ABSTRACT

An insulator to metal hermetic seal for electronic components and methods of making the hermetic seal. The hermetic seal may be a glass to metal or a ceramic to metal seal. The terminal member of the seal, whether glass to metal or ceramic to metal, may include a metal selected from the low-carbon steels, the Group I metals (copper, silver and gold, or alloys thereof or clad materials thereof), the Group VIII metals (nickel, palladium and platinum or alloys thereof or clad materials thereof), iron-nickel-cobalt alloys or clad materials thereof, nickel-iron alloys or clad materials thereof, chromium-iron alloys or clad materials thereof or a metal from any one of the film-forming metals which can form an electrolytic oxide film such as tantalum, aluminum, niobium, titanium, zirconium alloys thereof or clad materials thereof. The glass member may include any one of the borosilicate, potash-soda-barium, potash-soda-lead, soda-lime or aluminia-silicate glasses. The ceramic member may include any one of alumina, steatite, fosterite, or beryllia.

33 Claims, 9 Drawing Figures

PATENTED FEB 29 1972 3,646,405

INVENTORS
GEORGE WALLIS
JOHN J. DORSEY
BERNARD L. PHILLIPS

BY Charles W. Hoffmann
ATTORNEY

PATENTED FEB 29 1972 3,646,405

INVENTORS
GEORGE WALLIS
JOHN J. DORSEY
BERNARD L. PHILLIPS

BY Charles W. Hoffmann
ATTORNEY

HERMETIC SEAL

The present invention relates to an insulator to metal hermetic seal for electronic components, and more particularly, to a miniature glass to metal and ceramic to metal seal and methods of making the same.

Glass to metal and ceramic to metal hermetic seals have found a wide acceptance as hermetic seals for electronic components such as resistors, semiconductors, energy cells, capacitors and the like. The present invention is particularly useful, however, in miniature capacitors using solid or liquid electrolytes.

The glass to metal or glass to ceramic hermetic seals used in electronic components have several criteria to fulfill such as, for example, the seal should be hermetic over a wide range of temperatures; the seal should be resistant to corrosive action of acid electrolytes where it is used to electrolyte capacitors having an acid electrolyte, and the seal should possess mechanical properties sufficient to withstand adverse conditions such as shock, vibration and the like. The glass or ceramic portion or member of the hermetic seal should have high dielectric strength, high-volume resistivity, high-surface resistivity and low-power factor and loss factor.

Prior art glass to metal hermetic seals may be categorized into two general types of hermetic seals, that is, matched seals and unmatched seals. In matched hermetic seals, the coefficient of thermal expansion of the glass or the ceramic material corresponds closely to that of the metal members. In addition, the hermetic seal depends on adherence between the glass or the ceramic member and the metallic member to provide a hermetic seal therebetween. The maximum tolerable difference between the coefficient of expansion of each of the members of the seal is usually about $20 \times 10^{-7}/°C$.

Matched hermetic seals employ glasses which are especially mixed so that the coefficient of thermal expansion of the glass member corresponds closely to that of the metal member to which the glass member is to be fused. Whatever the metal member or the glass member employed in the matched hermetic seal, the joint between the members of the hermetic seal depends on adherence or fusion between molten glass member and the metal member. Generally, the metal member includes a preformed oxide film on the surface thereof or the metal member and the glass are heated or fired in an oxidizing atmosphere so that an oxide coating is forked on the surface of the metal member during the fabrication of the hermetic seal, or the metal is treated in some manner to promote adhesion between the glass and the metal. Generally, molten glass possesses a high affinity for metal oxides in that the metal oxides are readily wetted by the glass to thereby provide a glass to metal hermetic seal wherein the glass member is fused to the metal member.

Perhaps the most common of matched hermetic seals employ nickel-iron alloys such as alloy sold under the trade name KOVAR. The nickel-iron alloys generally possess coefficients of thermal expansion substantially the same as that of a borosilicate glass sold by the Corning Glass Company as 7,052. One of the steps generally performed in making matched hermetic seals using KOVAR metal members is that of forming an oxide film on the KOVAR metal members prior to fusing the KOVAR metal members to the Corning 7,052 glass by melting the glass. The thickness of the oxide film on the KOVAR metal members appears to be important for too little or too much oxide film may result in a seal which may not be hermetic or in a seal which may have other undesirable characteristics. The oxide film of the surface of the KOVAR metal members is dissolved or interlocked with constituents, such as, boric oxide and silica, of the molten glass. The oxide film on the KOVAR metal members appears to be the means by which a fused joint between the KOVAR members and the glass member of the matched hermetic seal is provided.

Compression hermetic seals, on the other hand, are based on the elasticity of the glass member and stresses formed in the glass member due to the differences in coefficient of thermal expansion of the metal member and the glass member. It should be seen that compression hermetic seals generally do not depend upon adherence or fusion between the glass and the metal member.

In fabricating glass to film-forming metal hermetic seals for use in electrolytic capacitors having an acid electrolyte, it is important that the terminal member be substantially inert to the corrosive action of the acid electrolyte or have the property of forming an electrolytic oxide on the exposed surface thereof which is substantially inert to the corrosive action of the acid electrolyte. If the hermetic seal is to be used in an acid electrolyte environment, the thermal coefficient of expansion and the chemical inertness of the metal member are of primary consideration. The electrolytic oxide formed on the surface of a film-forming metal where tantalum is used as the terminal member is an amorphous dielectric oxide film. The tantalum oxide film is generally a substantially uniform, thin layer of tantalum pentoxide electrochemically formed on the surface of the tantalum terminal member. If an electrolytic oxide film does not substantially cover the surface of the film-forming terminal member, the hermetic seal, when placed in the acid electrolyte environment, will exhibit high-electrical leakage, poor equivalent series resistance, poor voltage characteristics and the like. If the tantalum terminal has any substantial amount of crystalline, thermally grown tantalum pentoxide on its surface, it is very difficult to form an electrolytic oxide on the surface of the tantalum terminal.

Conventionally fabricated hermetic seals generally include a metal eyelet, a terminal means which projects through the aperture of the eyelet and a mass of glass which substantially completely fills the aperture of the eyelet and retains the terminal wire spaced from the eyelet. The geometry of the conventional hermetic seal is such that it is difficult to reduce the geometry of the hermetic seal to much less than a thickness of about 60 mils and a diameter of about 100 mils. The limitation on the dimensions of the seal limits the size to which the electronic component such as a capacitor may be reduced.

Accordingly, it is an object of the present invention to provide a hermetic seal for an electronic component which overcomes the problems of the prior art.

A further object of the present invention is to provide a hermetic seal for an electronic component which has a novel construction.

Another object of the present invention is to provide a hermetic seal for an electronic component which has a geometry having a thickness of about 25 mils and a diameter of about 60 mils.

Yet another object of the present invention is to provide a hermetic seal for an electronic component wherein the thermal coefficient of expansion of an insulative member is substantially the same as the thermal coefficient of expansion of a metallic member or members of the hermetic seal.

A further object of the present invention is to provide a hermetic seal for an electronic component including an insulative member having no meniscus.

Yet another object of the present invention is to provide a hermetic seal for an electronic component which does not rely on internal stresses developed within an insulative member to provide a hermetic seal.

Yet still another object of the present invention is to provide a hermetic seal for an electronic component which is substantially leak proof.

Another object of the present invention is to provide a hermetic seal including an insulative member such as glass or a ceramic material bonded to a metal member using a process whereby the insulative member is not rendered molten during fabrication of the hermetic seal.

Yet another object of the present invention is to provide a hermetic seal including an insulative member which is electrostatically bonded to a metal member.

Yet still another object of the present invention is to provide a hermetic seal for an electrolytic capacitor having an acid electrolyte including a terminal member which may be electrolytically anodized.

A further object of the present invention is to provide a method of making a hermetic seal for an electronic component which is inexpensive to manufacture.

Another object of the present invention is to provide a method of making a hermetic seal for an electronic component including a ceramic or glass member bonded to a metal member by an electrostatic attractive force.

Yet another object of the present invention is to provide a ceramic to metal or glass to metal seal for electronic components which is substantially leak proof throughout its useful life.

Yet another object of the present invention is to provide an electrolytic capacitor including a ceramic to metal or glass to metal hermetic seal.

Other objects of the invention and the nature thereof will become apparent from the following description considered in conjunction with the accompanying drawing. The dimensions of the members of the hermetic seal are exaggerated with respect to one another to better illustrate the concepts of the present invention.

Generally speaking, the present invention relates, in its broadest aspect, to an article of manufacture including an apertured electrically insulative member, a metal member sealed to and closing one end of the apertured insulative member and an elongated strip of metal attached to the metal member and projecting outwardly from the metal member into the aperture of the insulative member and methods of making the same. The article of manufacture may be used to hermetically seal electronic components such as semiconductors, integrated circuits, energy cells, resistors, capacitors and the like.

Figure 1:
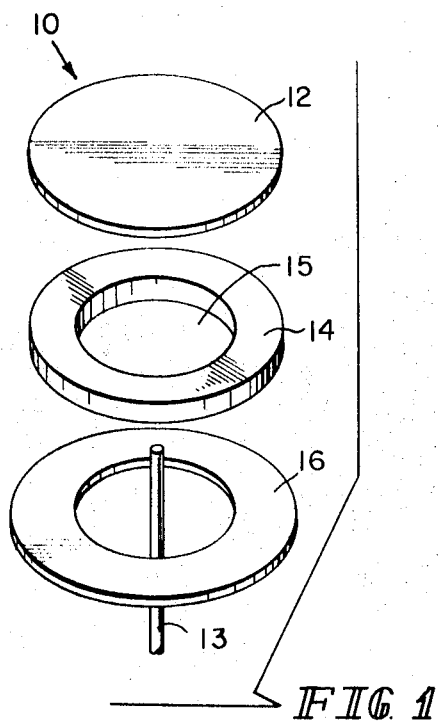
FIG. 1 is an enlarged perspective view of the insulator to metal seal of the present invention.
Figure 2:
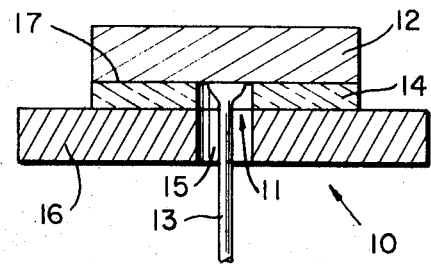
FIG. 2 is an enlarged cross-sectional side view of the insulator to metal seal shown in FIG. 1.
Figure 4:
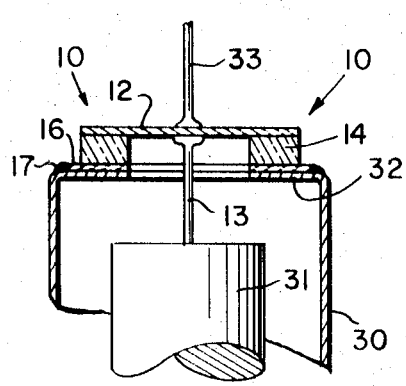
FIG. 4 is an enlarged cross-sectional side view of an electrolytic capacitor using the insulator to metal seal of the present invention to close the open end of a container.

Referring to the drawing, FIGS. 1 and 2 illustrate an insulator to metal hermetic seal 10 of the present invention. The insulator to metal hermetic seal 10 includes a terminal member 11 which comprises a metal plate or disc 12 and a metal electrode 13 fixedly attached to the plate by any suitable means such as by welding or the like. For purposes of illustration and not for purposes of limitation, the metal plate 12 may have a diameter of about 50 mils and a thickness of about 10 mils. The metal electrode may have a diameter of about 5 mils. It should be seen that the diameter of the metal plate is governed primarily by the diameter of the open end of a container 30, such as shown in FIG. 4, which the hermetic seal is intended to close and by the interface area 17 between adjacent surfaces of insulator ring 14 and the metal plate 12 necessary to effect a satisfactory hermetic bond, which is about 20 mils in width. The insulative ring 14 may be fabricated from any suitable electrically insulative material such as glass, ceramic material or the like and is bonded to the metal plate 12 by processes to be discussed hereinlater. The insulative ring may have a thickness of about 5 mils or more. The insulative ring may have an outside diameter about the same as the diameter of the metal plate, that is, about 50 mils, and an axial aperture 15 having a diameter of, for example, about 10 mils. An external metal terminal member (not shown) may be attached to the metal plate on the surface opposite the surface of the metal plate to which electrode 13 is attached. The insulative ring 14 may be bonded to a metal ring 16 as shown in FIG. 2. The thickness of metal ring 16 is about 10 mils. It is seen that the thickness of a hermetic seal including metal plate 12, insulative ring 14 and metal ring 16 is about 25 mils whereas the diameter of the seal may be about 50 mils which is considerably smaller in size than the size of the conventional insulator to metal seal.

The metal plate 12 member may be fabricated from any suitable metal such as a low-carbon steel having good machinability characteristics. The following examples of materials which may be used in the seal structure are given as weight percents. A suitable low-carbon steel may be SAE 1010 steel which contains about 0.08 percent to about 0.13 percent carbon, about 0.30 percent to about 0.6 percent manganese, up to about 0.04 percent phosphorous, up to about 0.05 percent silicon, the remainder essentially iron; wrought, free-cutting steels such as AISI-types B 1,112 or B 1,113 which contain up to about 0.13 percent carbon, about 0.6 percent to about 1 percent manganese, up to about 0.12 percent phosphorous and up to about 0.33 percent silicon, the remainder essentially iron. The thermal coefficient of expansion of SAE 1,010 steel is about $84 \times 10^{-7}$° C. and the thermal coefficient of expansion of B 1,112 and B 1,113 is about $84 \times 10^{-7}$/° C. In addition, the metal of the metal plate 12 may be selected from the Group I metals such as copper, silver and gold, alloys thereof or clad materials thereof and the like; the Group II metals such as nickel, palladium, platinum, alloys thereof or clad materials thereof and the like; or any of the film-forming metals such as tantalum, niobium, aluminum, titanium or zirconium alloys thereof or clad materials thereof and the like; iron-nickel-cobalt alloys or clad materials thereof and the like; nickel-iron alloys or clad materials thereof and the like; and chromium-iron alloys or clad materials thereof and the like.

Where the thermal coefficient of a particular metal to be used for the plate member 12 exceeds a thermal coefficient of expansion of about $100 \times 10^{-7}$/° C., such as for example aluminum, nickel, palladium, copper, gold and silver which have thermal coefficients of expansion of about $257 \times 10^{-7}$/° C., about $133 \times 10^{-7}$/° C., $117 \times 10^{-7}$/° C., $178 \times 10^{-7}$/° C., $143 \times 10^{-7}$/° C., and $206 \times 10^{-7}$/° C. respectively, the metal having a high thermal coefficient of expansion maybe used to clad a base metal or base metal alloy so as to reduce the effective thermal coefficient of expansion of a metal such as aluminum, nickel and the like to $100 \times 10^{-7}$/° C., or less. For example, a 10 mil thick piece of an iron-nickel alloy sold under the trade name KOVAR may be used as a base metal and may be clad with a 1 mil thick piece of aluminum. The aluminum clad KOVAR appears to possess an effective coefficient of thermal expansion similar to that of KOVAR, that is, the aluminum clad KOVAR appears to have a thermal coefficient of expansion of about $50 \times 10^{-7}$/° C. Thus, the metal having a coefficient of thermal expansion may be used to clad a base metal and the resultant clad material may have a coefficient of thermal expansion similar to that of the base metal.

If the hermetic seal of the present invention is to be used to hermetically seal electronic components in general, SAE 1010 steel and nickel-iron alloys, the nickel-iron alloys sold under the trade name KOVAR is most preferred. KOVAR may contain about 28.7 percent to about 29.2 percent nickel, about 17.3 to about 17.8 percent cobalt, up to about 0.5 percent manganese up to about 0.2 percent silicon, up to about 0.06 percent carbon, the balance essentially iron.

If the nickel-iron alloy sold under the trade name KOVAR is used as the material for the metal plate 12, the glass or ceramic material of the hermetic seal should have a thermal coefficient of expansion within about $20+10^{-7}/°$ C. of the metal of the metal plate 12 to provide a matched, hermetic seal. The thermal coefficient of expansion of KOVAR is about $50\times10^{-7}/°$ C. Suitable glasses which may have thermal coefficient of expansion similar to that of KOVAR are the borosilicate glasses which usually contain up to about 80 percent silica ($SiO_2$), up to about 14 percent boric acid ($B_2O_3$), up to about 4 percent soda ($Na_2O$), the remainder essentially alumina ($Al_2O_3$). Typical borosilicate glasses which may be used as the glass member of the seal may be 7,040, 7,050, 7,052, 7,055 and 7,056 sold by the Corning Glass Company, having thermal coefficients of expansion of about $48\times10^{-7}/°$ C. about $46\times10^{-7}/°$ C., about $46\times10^{-7}/°$ C., about $51.5\times10^{-7}/°$ C., and about $51\times10^{-7}/°C$. respectively. Typical borosilicate glasses sold by the Mansol Ceramics Company which may be as the glass member of the seal may be 02-000, 15-000, 33-000, 37-000 and 50-000 having thermal coefficients of expansion of about $46\times10^{-7}/°$ C., about $51.5\times10^{-7}/°$ C., about $46\times10^{-7}/°$ C., about $51\times10^{-7}/°$ C., and about $48\times10^{-7}/°$ C. respectively. Of the several borosilicate glasses, Corning 7,052 and 7,056 or Mansol 02-000 are preferred when the metal plate 12 is fabricated from KOVAR.

The metal of the electrode 13 may be the same as the plate or a different metal. It is preferred, however, that the metal of the electrode be substantially the same as the metal of the plate member.

A ceramic material such as alumina ($Al_2O_3$), steatite ($H_2Mg_3(SiO_3)_4$), fosterite ($Mg_2SiO_4$) and beryllia ($B\&O$) having thermal coefficients of expansion of about $64\times10^{-7}/°$ C., about $69\times\times10^{-7}/°$ C., about $100\times10^{-7}/°$ C., and about $60\times10^{-7}/°$ C., respectively, may be substituted for the glass material in the hermetic seal. When KOVAR is used as the metal for the plate member, alumina or beryllia are preferred with beryllia being the most preferred insulator material. It is to be understood that the other ceramic materials may be preferred over alumina or beryllia if the metal of the plate member is, for example, palladium or a palladium clad material having a thermal coefficient of expansion of about $89\times10^{-7}/°$ C. Where palladium or palladium clad material is used for the metal of the plate member 12, fosterite having a thermal coefficient of expansion of about $100\times10^{-7}/°$ C. would be preferred over alumina and beryllia.

FIG. 4 shows the insulator to metal seal 10 of the present invention used to close the open end of a container 30 which serves as the housing for an electronic component such as capacitor body 31. The capacitor body may be an anode fabricated from a film-forming metal such as tantalum, aluminum, niobium, titanium, zirconium and the like having a myriad of intercommunicating voids. A solid electrolyte of manganese dioxide ($MnO_2$) or the like may be used as the electrolyte of the capacitor. The use of a solid electrolyte such as manganese dioxide may permit the use of nearly any one of the above-mentioned combinations of metal members and glass or ceramic members to provide the insulator to metal hermetic seal. The open end of the container 30 is closed by attaching the metal ring 16 of the insulator to metal hermetic seal to an annular shoulder of flange 32 of the container by any suitable means such as by welding, soldering and the like as shown at 17 in FIG. 4.

Where the capacitor body 31 is substantially immersed in an acid electrolyte such as sulfuric acid, acetic acid, lithium chloride and the like, the metal materials of the capacitor such as the container 30, the plate 12 and the electrode 13 should be of the same film-forming metal or the container and the plate should be fabricated from a material chemically inert to the corrosive action of the acid electrolyte in order to minimize the occurrence of galvanic corrosion within the capacitor housing. Detrimental galvanic corrosion may occur between dissimilar metals in the acid electrolyte environment present in a capacitor using an acid electrolyte. The galvanic corrosion may lead to high-leakage currents and/or deterioration of the joint between the container and the insulator to metal seal. The existence of either one of or both of the conditions may harmfully effect the operation of the liquid electrolyte capacitor. Therefore, in an electrolytic capacitor having a tantalum anode and a sulfuric acid electrolyte, the metals of the container and the seal should be tantalum or a metal which is substantially inert with respect to the acid electrolyte such as silver, gold, platinum, palladium, alloys thereof such as a silver 10 percent gold alloy and materials clad with silver, gold, platinum, palladium such as stainless steel clad with silver having a thickness of at least 1 mil or stainless steel clad with gold having a thickness of at least 1 mil or stainless steel clad with an alloy of silver 10 percent gold having a thickness of at least 1 mil and the like. Of the several possible metal materials which may be used as the container material and the metal portion of the hermetic seal of an acid electrolyte tantalum capacitor, it is preferred that the metal members of the hermetic seal be fabricated from tantalum or stainless steel clad with an alloy of silver- 10 percent gold with tantalum being the most preferred material. Where tantalum is used as the metal of the plate member 12, the glass or ceramic ring should have a thermal coefficient of expansion which approximates the thermal coefficient of expansion of tantalum. Tantalum has a thermal coefficient of expansion of about $65\times10^{-7}/°$ C. Suitable glasses would be Corning Glasses 7,040, 7,050, 7,052, 7,055 and 7,056 having thermal coefficients of expansion of about $48\times10^{-7}/°$ C., $46\times10^{-7}/°$ C., $46\times10^{-7}/°$ C., $46\times10^{-7}/°$ C. and $51\times10^{-7}/°$ C., respectively. Corning glass 7,052 having a thermal coefficient of expansion of about $46\times10^{-7}/°$ C., is preferred. Suitable ceramic materials for the insulator portion of the hermetic seal would be steatite, alumina and beryllia with alumina and beryllia being preferred with alumina being the most preferred ceramic material.

Where niobium is used as the film-forming metal of the capacitor anode of the capacitor body 31 and the electrolyte is an acid electrolyte such as sulfuric acid or the like, the metal members of the hermetic seal should be niobium or a metal or clad material which is chemically inert to the acid electrolyte in order to minimize galvanic corrosion. Niobium has a thermal coefficient of expansion of about $73\times10^{-7}/°$ C. A suitable glass may be Corning 6,810 which has a thermal coefficient of expansion of about $69\times10^{-7}/°$ C. A suitable ceramic material for the insulator portion of the hermetic seal may be steatite, alumina and beryllia with steatite being the most preferred ceramic material.

Where gold is used for the plate member 12 in an electrolytic capacitor having an acid electrolyte and the capacitor body is an anode of film-forming metal fabricated from tantalum, niobium and the like, a suitable glass may be any of the potash-soda-lead glasses such 1,990 sold by the Corning Glass Company having coefficient of expansion of about $124\times10^{-7}/°$ C. A suitable ceramic material may be fosterite having a coefficient of thermal expansion of about $100\times10^{-7}/°$ C. The coefficient of expansion of gold is about $142\times10^{-7}/°$ C., however, the effective coefficient of expansion of gold may be reduced by providing a base metal clad with gold which may have a thermal coefficient of expansion similar to that of the base metal.

Where platinum is used for the plate member 12 in an electrolytic capacitor having an acid electrolyte and a capacitor body 31 is fabricated from tantalum, niobium and the like, a suitable glass for the insulator portion of the insulator to metal seal may be any of the soda-barium glasses such as Corning 6,750 having a thermal coefficient of expansion of about $88\times10^{-7}/°$ C., the high-lead glasses such as Corning 7,570 having a thermal coefficient of expansion of about $84\times10^{-7}/°$ C., and the potash-soda-barium glasses such as Corning 9,010 C., with Corning 9,010 potash-soda-barium glass being the most preferred glass for use with platinum. The thermal coefficient of expansion of platinum is about $89\times10^{-7}/°$ C. A suitable ceramic material for the insulator portion of the hermetic seal may be steatite and alumina with steatite being the most preferred ceramic material.

It should be seen that any of the ceramic materials, alumina, steatite, fosterite, or beryllia may be substituted for any of the glasses mentioned above as long as the thermal coefficient of expansion of the ceramic material approximates that of the metal material so as to provide a matched hermetic seal.

Figure 3:
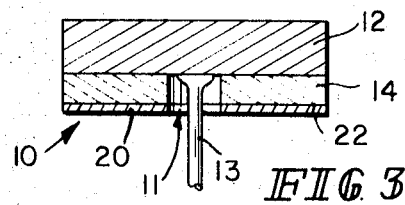
FIG. 3 is an enlarged cross-sectional side view of an insulator to metal seal illustrating one end of the insulator member substantially covered with a fired on paint of a solderable metal.

Referring now to FIG. 3, an embodiment of the insulator to metal seal 10 is illustrated. The seal 10 includes a terminal member 11 which comprises a metal plate 12 and a metal electrode fixedly attached to the plate by any suitable means such as by welding or the like. A solderable metal 20 is "painted" onto the insulator member in lieu of bonding the metal ring 16 to the insulator member. A suitable solderable metal may be provided by a paint containing platinum and gold manufactured by DuPont as 7,553 or 8,236. The solderable metal is "painted" onto surface 22 of the insulator material sufficiently thick to provide a metal coating at least about 1 mil thick after firing the "paint" to bond it to the insulator material. The platinum and gold is placed on surface 22 of the insulator by any suitable process such as by a silk screening technique. The paint is fired at about 700° C. to about 900° C. for about 15 to 30 minutes.

Figure 5:
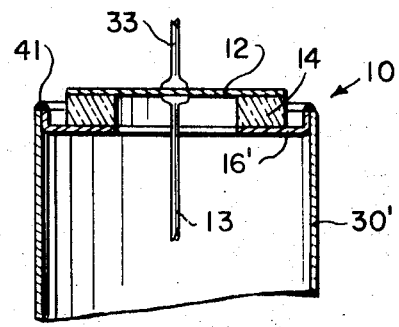
fig. 5 is an enlarged cross-sectional side view of an electronic component using the insulator to metal seal of the present invention to close the open end of a container.

FIG. 5 shows a hollow, cylindrical container 30' having its open end closed by insulator to glass seal 10 having metal ring 16' attached to the inner wall of the cylindrical container by any suitable means such as by welding, soldering and the like as shown at 41.

Figure 6:
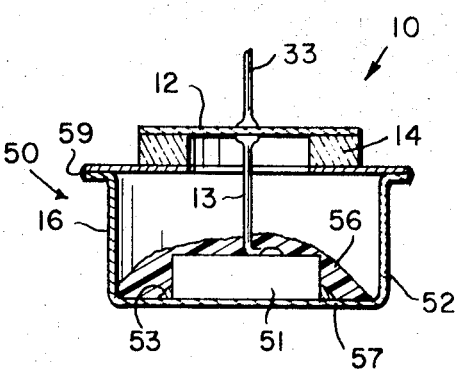
FIG. 6 is an enlarged cross-sectional side view of a semiconductor device using the insulator to metal seal of the present invention to close the open end of a container.

Referring now to FIG. 6, a semiconductor device 50 is shown. A semiconductor wafer 51, fabricated from any suitable material such as germanium, silicon or the like is attached to a substantially flat member 57 by any suitable material such as by solder 53. A cup-shaped container or housing 52 has the open end thereof closed by the insulator to metal seal 10 attached to the inner wall of the housing 52 by any suitable means such as welding, soldering and the like as shown at 59.

It is seen that the solder serves to fixedly retain the wafer on the flat extremity of the housing and also serves to electrically connect the wafer to the cup-shaped housing. An electrically conductive electrode 13 is affixed to the major surface of the wafer thereby forming a contact. The outer surface of the flat extremity of the cup-shaped housing may serve as the other conductive lead (not shown) may be soldered to the outer extremity of the cup-shaped housing. The wafer 51 is substantially completely covered by any suitable insulative material such as epoxy resin 56 or the like. The epoxy resin coating over the wafer serves to protect the wafer from humidity, dust or other like contaminates. The epoxy resin also serves to protect the wafer from shock and vibration. The housing is fabricated from any suitable heat conductive and resilient material such as aluminum, copper and the like. The insulator to metal hermetic seal 12 is attached to the circular flange 57 of the housing 52 to thereby hermetically seal the semiconductor device.

It should be noted that no meniscus exists between the glass and the spaced apart metal members 12 and 16 or 16', that is, the external surface of the glass is not a crescent-shaped surface which is either concaved such as exists when the glass wets the metal members 12 and 16 or 16' or convex such as exists when the liquid does not wet the metal members 12 and 16 or 16'. The lack of meniscus may be due in part to the use of an electrostatic bonding process to bond the glass to the metal members.

Figure 9:
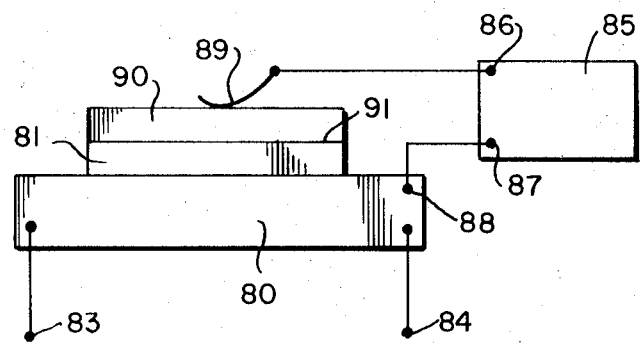
FIG. 9 is a schematic illustration of equipment used to bond an insulator to metal by the application of an electric potential producing the passage of current to the insulator and the metal.

The method of bonding the insulative member such as the glass member or the ceramic member to the metal member of the insulator metal seal may be accomplished in several ways. A preferred method of bonding the insulator member to the metal member is by an electrostatic bonding process. Fur purposes of illustrating the electrostatic bonding process assume that the metal member is KOVAR and the insulative member is a borosilicate glass such as Corning 7,052 containing up to about 65 percent silica ($SiO_2$), up to about 7 percent alumina ($Al_2O_3$), up to about 18 percent boric oxide ($B_2O_3$), up to about 10 percent lithium oxide ($Li_2O$), up to about 2 percent soda ($Na_2O$), up to about 3 percent potash ($K_2O$), and the remainder substantially barium oxide. The KOVAR member and the glass member are placed in contact as shown on platen 80 as illustrated in FIG. 9. The platen 80 is any suitable means by which the glass member is heated so as to increase the electrical conductivity thereof. In the illustrated embodiment of FIG. 9, the platen 80 may be a resistance heated means provided with input terminals 83 and 84 for connection to a suitable power source such as an AC source (not shown). The platen or the glass member may be heated by any of several different methods other than the suggested resistance heating method. For example, the platen may be heated by a gas flame or by a suitable induction heating technique. It may be possible to heat the glass member directly as in a furnace (not shown) thereby eliminating the use of the platen 80.

A suitable power source such as, for example, a direct current power source 85 including an output terminal 87 connected to platen 80 and another output terminal 86 connected to the KOVAR member 90. The power source may be a direct current power source, a pulsating direct current power source or in some instances, an alternating current power source. The power source has its output terminals 86 and 87 connected to the KOVAR member 90 and the glass member 81 through the platen respectively. The terminals 86 is shown as being connected to the KOVAR member through a resilient contact such as a spring contact 89 which is in direct contact with the KOVAR member. Output terminal 87 of the power source is connected to an input terminal 88 of the platen and through said platen to the glass member 81.

In the practice of the present invention, the KOVAR member and glass member are placed in close contact as shown in FIG. 9 and the glass member is heated to a temperature below its softening point through the platen. The softening point of Corning 7,052 glass is about 710° C. and the working point is about 1,130° C. An electrical potential provided by the power source is applied cross the juxtaposed metal and glass members forming a bond at the interface 91 between the KOVAR member and the glass member. The bond between the glass and the metal member is believed to be formed by the electrostatic attractive force generated when a potential applied across the juxtaposed metal and glass members is sufficient to produce a current flow through the interface between the KOVAR member and the glass member. The potential required to provide the necessary current flow varies dependent upon various conditions such as the type of glass, the thickness thereof and the surface finish of the juxtaposed surfaces. The thickness of the glass member and the KOVAR member however, is not though to be critical and may vary within wide limits, the limitation on the low side being governed principally by the capability of handling preparatory to the bonding of the glass member and the metal member. The preferred temperature to which the glass member is heated will vary dependent on the type of glass, but generally will be in the range of about 150° C. to about 1,000° C. For a variety of borosilicate glasses, the temperature preferably is in the range of about 300° to 700° C; for soft glasses such as soda-lime glasses, the range is about 150° to 400° C., and for quartz glasses the temperature may vary from about 600° C. to about 1,000° C. The applied voltage and the current density may vary within wide ranges for it is thought that neither value is critical. In general, the potential is usually in the range of about 200 to about 2,000 volts. A definite value for the current density cannot be established particularly since, if the applied potential is maintained constant, the current gradually decreases from, for example, a value in the range of about 100 to about 300 or more microamperes/cm.$^2$ to approximately 0 as the bond progresses from its starting point to the edges of the juxtaposed members. The higher the potential and the corresponding current the less time required to effect electrostatic bonding between the juxtaposed members. The upper limit of the potential and the current density is that disruptive discharging should not be permitted to occur between the glass member and the metal member.

Another factor involved in bonding KOVAR to glass using the electrostatic bonding process is the surface finish and the flatness of the two surfaces of the bonding interface. Good bonds may be obtained more easily when the surfaces are substantially smooth. Polishing of the interface surfaces appears to provide a better bond between the glass member and the metal member.

The type of power source, and in the case of direct current, the polarity is applied to the glass member and the metal member may depend in some instances on the type of glass being used to provide the insulator portion of the hermetic seal. For example, the distribution characteristics of the glass whether symmetrical or asymmetrical determine, it is thought, the type of power source used to provide the potential and current to be used to electrostatically bond the glass member and the metal member. The copending application of Pomerantz, Wallis and Dorsey, Ser. No. 620,794 filed Mar. 6, 1967, entitled "Bonding Electrically Conductive Metals to Insulators," and assigned to the assignee with the present application gives potential distribution characteristics for insulators and methods for determining the same. For example, the borosilicate glasses in general have asymmetrical distribution characteristics such as Corning 7,740 which is an asymmetrical borosilicate glass. Corning glass 7,059 is another example of a symmetrical glass. For optimum bonding results where the insulator 81 is 7,052, the terminal 88 should be made negative. If the glass used should be asymmetrical but in the opposite direction from the glass 7,052 then the terminal 88 should be connected to the positive side of the power source 15.

If the glass being bonded to KOVAR has substantially symmetrical potential distribution as is the case of Corning 7,059 glass, the polarity of the applied potential and the direction of current flow through the KOVAR in the glass is not of any importance That is, either positive or negative direct current or pulsating direct current or alternating current will bonding if the glass has symmetrical potential distribution.

In a specific example of bonding glass to KOVAR, the glass Corning 7,052 having a thickness of about 10 mils is heated to a temperature in the range of about 500° C. to about 550° C. and a direct current power source was applied across the glass and the KOVAR member with the glass and KOVAR in contact in a manner generally illustrated in FIG. 9. The negative output terminal of the power source is connected to the glass. A potential of about 800 to about 1,000 volts was applied for a short period of time in the range of 1 to 3 minutes or more causing a current flow from the KOVAR to the glass and a satisfactory hermetic bond is effected.

It may be noted that a lack of meniscus may be observed in the insulator to metal seal fabricated by the electrostatic bonding process. The lack of meniscus may be due in part to the steps followed during the process.

Alternatively, the insulator to metal seal 10 shown in FIGS. 1, 2, 3 and 4 may be fabricated by stacking the metal washer and a preformed insulator ring 14 on the metal plate 2. Assuming the metal plate and the metal washer are a film-forming metal such as tantalum and the insulator ring material is a borosilicate glass such as Corning 7,052, the stacked array may be heated in any suitable furnace such as an induction heating furnace under a pressure of about 1 atmosphere in an inert atmosphere such as flowing argon at a temperature above the working point temperature of the glass, which for Corning 7,052 borosilicate glass is about 1,130° C. The stacked array may be heated to about 1,100° C. to about 1,200° C. for about 20 to about 30 minutes. The insulator to glass seal is cooled to room temperature under argon. The seal may be fired under reduced pressure or in a vacuum. Firing the seal in an inert glass atmosphere substantially prevents the formation of thermally grown tantalum pentoxide, which, may provide a surface on which it is difficult to form an electrolytic oxide film.

The process immediately above may also be used to provide a glass to KOVAR hermetic seal except that the KOVAR is heated in an oxidizing atmosphere such as air rather than in an inert atmosphere.

Another method of making the insulator to metal seal 10 shown in FIGS. 1, 2, 3 and 4 is by stacking the metal washer and a preformed insulator ring 14 on the metal plate 12. Assuming the metal plate and the metal washer are each stainless steel clad with about 1 to 3 mils of an alloy of silver- 10 percent gold and the insulator ring material is potash-soda-barium glass such as Corning 9,010, the stacked array may be heated in any suitable furnace such as an induction heating furnace under a pressure of about 1 atmosphere in an inert atmosphere such as flowing argon at a temperature of about 930° C. to about 950° C. for about 20 to about 30 minutes. The temperature to which the glass is heated is above the softening point temperature of the glass and below the working point temperature of the glass. The insulator to glass seal is cooled to room temperature under argon. The seal may be fired under reduced pressure or in a vacuum.

Yet another method of providing the insulator to metal seal is to stack the metal washer, the preformed insulator and the metal plate in a suitable press such as a jig. A moderate amount of pressure, that is about 25 lbs. per sq. inch, may be provided. Assuming the metal plate and the metal washer are a film-forming metal such as tantalum and the insulator ring material is a borosilicate glass such as Corning 7,052, the stacked array may be heated in any suitable furnace such as an induction heating furnace under a pressure of about 1 atmosphere such as flowing argon at a temperature above the softening point temperature of the glass but below the working point temperature of the glass. The array may be heated to about 700° C. to about 750° C. for about 20 to about 30 minutes under a pressure of about 25 p.s.i. applied by the jig. The insulator to glass seal is cooled to room temperature under argon The seal may be fired under reduced pressure or in a vacuum. Firing the seal in an inert glass atmosphere substantially prevents the formation of thermally grown tantalum pentoxide, which, provides surface on which it is difficult to form an electrolytic oxide film.

The ceramic insulator materials, that is, alumina ($Al_2O_3$), steatite ($H_2Mg_3(SiO_3)_4$), fosterite ($Mg_2SiO_4$) and beryllia (BeO), may be bonded to the metal plate 12 and/or to the metal ring 16 or 16' by metallization and brazing of the ceramic material thereto. The metal may be applied to the ceramic surface by painting, vapor deposition, flame spraying and the like. Some metals adhere to some ceramic surfaces with little or no special surface preparation. Whether by direct wetting or by special formation of a transition layer, the bond is satisfactory. Coatings of silver, copper, gold, platinum, iron, cobalt and nickel may be used with the noble metals silver, gold and platinum being preferred and with a silver being the most preferred of the noble metals. A silver layer may be applied to the ceramic material by chemical reduction, by dusting or by painting. The noble metals are usually painted. Unlike silver coatings, platinum coating may not require firing prior to being brazed. Silver paint may be applied by any conventional silk screening process and thereafter heated to a temperature of about 700° C. to about 900° C. for 15 to 30 minutes. A suitable silver paint includes silver flake about 45 percent, lead borosilicate about 2.5 percent, alkydresin about 4.5 percent and butylalcohol-xylene-toluene about 48 percent. A suitable platinum paint includes platinum powder about 40 percent, mercuric chloride about 10 percent, lead borosilicate about 3.5 percent, anthracene about 2.5 percent and a plasticized resin medium about 44 percent. A suitable cobalt paint contains cobalt powder flux, cellulose nitrate and amyl lactate and is fired in a suitable reducing atmosphere such as argon at about 1,350° C. to about 1450 C.

Fired-on silver films may be timed before brazing, however, if the silver surface is maintained too hot too long, either in timing or brazing, substantially all the silver may dissolve unless previously coated with a barrier layer. Therefore, the initial layer may be built up with an electroplate or sprayed-on deposit of nickel or copper.

The metallization of the ceramic material may be accomplished by vapor depositing chromium, titanium, silicon films and the like. The films may be deposited by spraying volatile metal chlorides in hydrogen onto the ceramic material from burner nozzles. The gaseous metal chlorides and the hydrogen react to provide the metal on the surface to be metallized. The hot hydrogen chloride reaction product serves to blanket the surface and inhibit oxidation. Molybdenum, tungsten, and tantalum films may be formed by hydrogen reduction of volatile metal chlorides. Iron, nickel, and cobalt films may be deposited by decomposition of volatile metal carbonyls.

Flame spraying may also be used to provide a bonded metal coating on ceramic materials. Mixtures of tungsten carbide, powers and iron, nickel or cobalt may be flame sprayed onto the ceramic material.

An example of bonding steatite to KOVAR is as follows, Steatite may be subjected to successive molybednum-iron and nickel coatings with the KOVAR being copper flashed. A small piece of silver is placed between the two materials and the assembly is fired at about 1,000° C. to provide a seal including steatite bonded to KOVAR.

Figure 7:
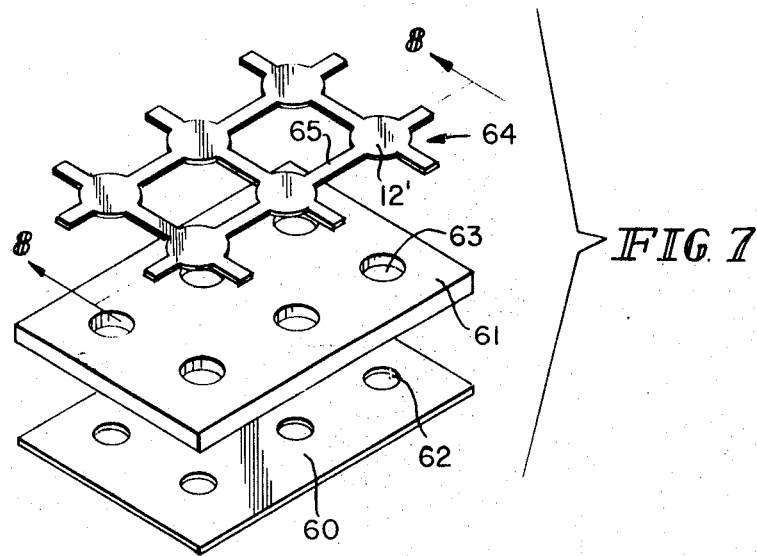
FIG. 7 is an enlarged perspective view of a plurality of insulator to metal seals of the present invention.
Figure 8:
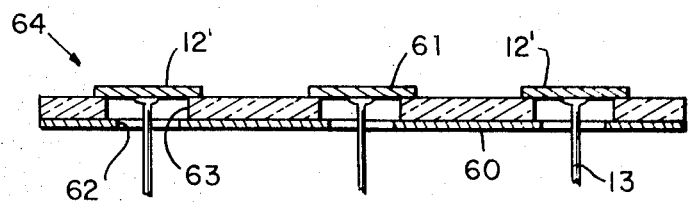
FIG. 8 is an enlarged cross-sectional side view of the plurality of insulator to metal seals illustrated in FIG. 7.

FIGS. 7 and 8 illustrate a plurality of insulator to metal seals 10. The plurality of seals may be used to provide external terminal for an electronic component such as an integrated circuit. A metal sheet 60 fabricated from any of the metals discussed hereinbefore and a sheet 61 of insulative material are provided with a multiplicity of matching apertures 62 and 63 respectively. A geometrical configuration 64 as shown in FIG. 7 includes plates 12′ interconnected by reduced portions or necks 65. The members are sealed to each other using any one of the methods described hereinbefore. The necks may be removed by any suitable process to provide the structure of FIG. 8. A suitable process may be depositing a suitable wax or resist over the plates 12′ and then using an etching process to remove the reduced neck portions 65.

While the invention is illustrated and described in an embodiment, it will be understood that modifications and variations may be affected without departing from the scope of the novel concepts of this invention and as set forth in the appended claims.

Having thus described our invention, we claim:

1. An article of manufacture comprising:
an electrical component within a container therefore, said container having at least one opening therein;
said electrical component having an electrically conductive lead member in electrical contact with said component;
a seal member closing said opening in said container; said seal comprising;
an insulative member of glass or ceramic material having an aperture therein;
said insulative member being integrally bonded to a first metal member along a first band interface, said first metal member having an aperture therein;
said insulative member also being integrally bonded to a second metal member along a second bond interface, said second bond interface being substantially parallel to said first bond interface, said second member closing the aperture in said insulative member;
said lead member passing through the aperture in said first metal member and through the aperture in said insulative member and into mechanical engagement with said second metal member;
said insulative member being elongated in a direction substantially parallel to said first and second bond interfaces.

2. The article as claimed in claim 1, wherein said metal member is selected from the group of low-carbon steels, Group I metals or alloys or clad metals thereof, Group VIII metals or alloys or clad metals thereof, film-forming metals or alloys or clad metals thereof, iron-nickel alloys or clad metals thereof or chromium-iron alloys or clad materials thereof.

3. The article as claimed in claim 2, wherein said insulator member is a glass selected from the group of borosilicate glasses, potash-soda-barium glasses, potash-soda-lead glasses, soda-lime glasses or alumina-silicate glasses.

4. The article as claimed in claim 3, wherein said glass is a borosilicate glass.

5. The article as claimed in claim 2, wherein said insulator member is a ceramic material selected from the group of alumina, steatite, fosterite and beryllia.

6. The article as claimed in claim 2, wherein said Group I metals are copper, silver or gold, said Group VIII metals are nickel, palladium or platinum and said film-forming metals are tantalum, aluminum, niobium, titanium or zirconium.

7. The article as claimed in claim 1, wherein said insulative member is borosilicate glass or alumina and said metal member and said elongated metal strip of metal are tantalum or a nickel-iron alloy or a silver-gold alloy.

8. The article as claimed in claim 7, wherein said metal member and said elongated strip of metal are tantalum.

9. The article as claimed in claim 7, wherein said metal member and said elongated metal strip are a nickel-iron alloy including up to about 30 weight percent nickel, up to about 18 weight percent cobalt, traces of manganese and silicon and carbon, the remainder essentially iron.

10. The article as claimed in claim 7, wherein said metal member and said elongated metal strip are a silver-gold alloy including up to about 90 percent silver, the remainder essentially gold.

11. An article according to claim 1 wherein said article is a capacitor and said component is at least in part a capacitor anode.

12. A capacitor according to claim 11 which is an electrolytic capacitor.

13. An article according to claim 1 wherein said seal member is a hermetic seal.

14. The hermetic seal of claim 13, wherein said aperture of said insulator member is about 10 mils or more and said insulator member having a length and a width of about 50 mils or more, said metal member closing said one end of said apertured insulative member having a length and a width of about 50 mils or more, and said aperture of said apertured metal member having a diameter of about 10 mils or more and having a length and width of about 50 mils or more.

15. The hermetic seal of claim 14, wherein said elongated strip of metal is spaced from the inner wall of said aperture of said insulative member and from the inner wall of said apertured metal member.

16. The hermetic seal of claim 15, wherein said elongated metal strip is a metal wire having a diameter of about 5 mils or more.

17. The hermetic seal of claim 16, wherein the thickness of said insulative member is about 5 mils or more, the thickness of said metal member closing said one end of said apertured insulative member is about 10 mils or more and the thickness of said apertured metal member is about 1 mil or more.

18. The hermetic seal of claim 17, wherein said thickness of said apertured metal member is about 10 mils or more.

19. The article as claimed in claim 17, wherein said metal member is selected from the group of low-carbon steels, Group I metals or alloys or clad metals thereof, Group VIII metals or alloys or clad metals thereof, film-forming metals or alloys or clad metals thereof, iron-nickel alloys or clad metals thereof or chromium-iron alloys or clad materials thereof.

20. The article as claimed in claim 17, wherein said insulator material is a glass selected from the group of borosilicate glasses, potash-soda-barium glasses, potash-soda-lead glasses, soda-lime glasses or alumina-silicate glasses.

21. The article as claimed in claim 21, wherein said glass is a borosilicate glass.

22. The article as claimed in claim 17, wherein said insulator material is a ceramic material selected from the group of alumina, steatite, fosterite and beryllia.

23. The article as claimed in claim 19, wherein said Group I metals are copper, silver or gold, said Group VIII metals are nickel-palladium or platinum and said film-forming metals are tantalum, aluminum, niobium, titanium or zirconium.

24. The article as claimed in claim 17, wherein said insulator member is borosilicate glass or alumina and said metal member and said elongated metal strip are tantalum or a nickel-iron alloy or a silver-gold alloy.

25. The electrolytic capacitor of claim 11, wherein said anode is a film-forming metal selected from tantalum, niobium, aluminum, titanium or zirconium.

26. The electrolytic capacitor of claim 25, wherein said anode is tantalum, or niobium or aluminum; said metal member sealing said open end of said insulator member and said apertured metal member and said elongated member are tantalum, niobium, aluminum, silver gold, palladium, platinum, alloys thereof or clad materials thereof; and said insulator member is glass or ceramic material.

27. The electrolytic capacitor as claimed in claim 26, wherein said insulator material is a glass selected from the group of borosilicate glasses, potash-soda-barium glasses, potash-soda-lead glasses, soda-lime glasses or alumina-silicate glasses.

28. The electrolytic capacitor as claimed in claim 27, wherein said glass is a borosilicate glass.

29. The electrolytic capacitor as claimed in claim 26, wherein said insulator material is a ceramic material selected from the group of alumina, steatite, fosterite and beryllia.

30. The electrolytic capacitor of claim 26, wherein said anode and said metal member sealing said open end of said insulator member and said apertured metal member and said elongated metal member are tantalum and insulative member is borosilicate glass or alumina.

31. The electrolytic capacitor of claim 30, wherein said borosilicate glass includes up to about 65 weight percent silica, up to about 7 weight percent alumina, up to about 18 weight percent boric oxide, up to about 10 weight percent lithium oxide, up to 2 weight percent soda, up to about 3 weight percent potash, the remainder essentially barium oxide.

32. The electrolytic capacitor of claim 26, wherein said anode is tantalum and said metal member sealing said open end of said insulative member is an alloy of up to about 90 weight percent silver, the remainder essentially gold.

33. The electrolytic capacitor of claim 11, further including terminal lead means attached to said metal member closing said one end of said insulator member on a side opposite to said side to which said elongated metal member is attached.

* * * * *